Patented Feb. 1, 1944

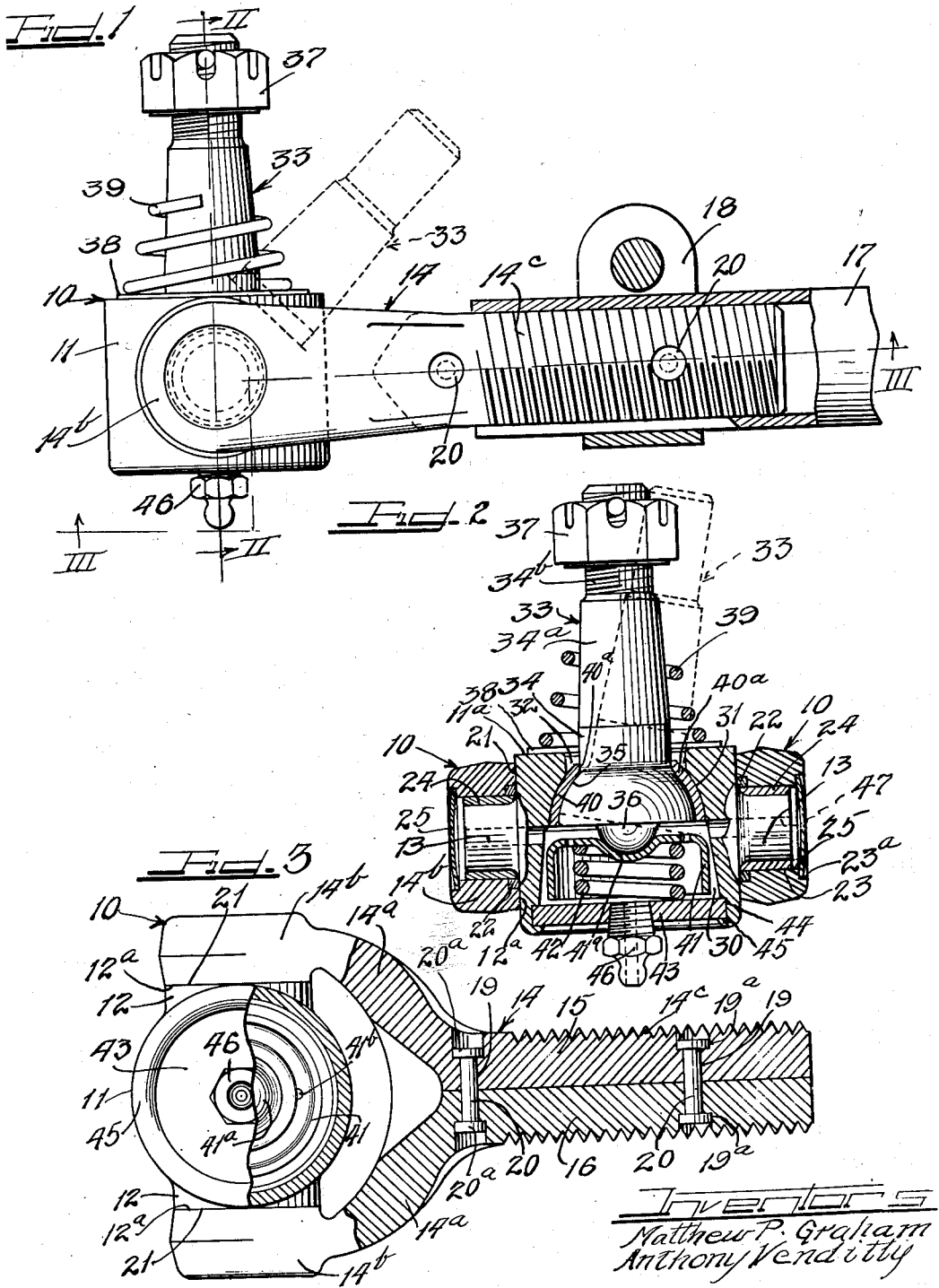

2,340,467

UNITED STATES PATENT OFFICE 2,340,467

TIE ROD JOINT ASSEMBLY

Matthew P. Graham and Anthony Venditty, Detroit, Mich., assignors to Thompson Products Incorporated, Cleveland, Ohio, a corporation of Ohio Application May 2, 1942, Serial No. 441,511

4 Claims. (Cl. 287—90)

This invention relates to swingably mounted joints.

More specifically the invention relates to tiltably mounted tie rod type joints especially useful for accommodating greater angulation than can be accommodated by the usual type tie rod joint.

In accordance with this invention a joint housing which tiltably and rotatably supports a stud is tiltably mounted on a support so that it can swing throughout a wide angle and thereby increase the angulation range or tilting range of the stud in at least one plane.

The joint housing is preferably equipped with laterally extending trunnions which rotate in bearings of a yoke member. The yoke member can have a threaded shank for insertion in the end of a tie rod or other internally threaded member.

A feature of the invention resides in the lubrication of all bearing surfaces in the joint assembly from a single source. For this purpose the joint housing can carry a lubricant fitting for supplying grease, oil, or other lubricant to the interior of the housing. The trunnions can have bores or holes therethrough for transmitting grease from the interior of the housing to the trunnion bearings.

Another feature of the invention is the yoke member support for the joint housing. This support can be made from two identical half-sections which are adapted to be riveted or otherwise joined together along the shank portions thereof without interfering with threaded insertion of the shank portions in an internally threaded member.

A further feature of the invention resides in the provision of seals or gaskets between the housing and the supporting yoke so that excessive leakage of lubricant will not occur.

An object of the invention is to provide a joint construction accommodating angulation throughout a wide arc.

A further object of the invention is to provide a tie rod type joint having one set of bearing surfaces accommodating tilting movements of the joint stud in all planes, another set of bearing surfaces accommodating rotating movement of the stud about its own axis, and still another set of bearing surfaces accommodating tilting of the stud in one plane throughout a greater arc than that accommodated by the first mentioned set of bearing surfaces.

A specific object of the invention is to provide a tie rod type joint with a swingable mounting for increasing the angulation of the joint in at least one plane.

Another object of the invention is the provision, in a tie rod joint assembly, of a multi-piece yoke support adapted to be threaded into an internally threaded member such as a tie rod or the like for swingably supporting a tie rod joint at its free end.

A still further object of the invention is to provide a lubricated swingably mounted joint construction wherein all bearing surfaces of the construction are lubricated from a single fitting.

Other and further objects of the invention will be apparent to those skilled in the art from the following detailed description of the annexed sheet of drawings which, by way of preferred example, illustrates one embodiment of the invention.

On the drawing:

Figure 1 is a side elevational view of a joint construction according to this invention mounted in the end of an internally threaded tie rod and illustrating such end of the tie rod in partial vertical cross section.

Figure 2 is a vertical cross-sectional view, with parts in elevation, taken along the line II—II of Figure 1.

Figure 3 is a longitudinal cross-sectional view, with parts in plan, taken along the line III—III of Figure 1.

As shown on the drawing:

In Figures 1 to 3, inclusive, the reference numeral 10 designates generally a joint construction according to this invention. The joint 10 includes a cylindrical housing or casing 11 with cylindrical bosses 12 projecting laterally from diametrically opposed sides thereof as best shown in Figure 3. The bosses 12 have flat outer faces 12a and, as shown in Figure 2, reduced diameter trunnions 13 project outwardly from the flat faces 12a of the bosses 12.

A yoke member 14 composed of identical half-sections 15 and 16 has outwardly bowed arm portions 14a terminating in eye-ends 14b and an externally threaded shank portion 14c adapted to be threaded into the slotted internally threaded end of a tie rod 17 as shown in Figure 1. A clamp 18 can be disposed around the slotted end of the tie rod 17 to contract the slotted end around the threaded shank and lock the same therein.

The shank portion 14c can have holes 19 bored therethrough at spaced intervals along the length thereof. These holes have countersunk end portions 19a. Rivets 20 extend through the holes 19 and have the heads 20a on the opposite ends thereof seated in the countersunk portions 19a to hold the half-sections 15 and 16 together in assembled relation without interfering with the threads along the shank.

The eye ends 14b of the outwardly bowed arms 14a of the yoke member 14 are in spaced opposed aligned relation and have flat inner faces 21 adapted to abut the flat outer faces 12a of the bosses 12. As best shown in Figure 2, the flat inner faces 21 are grooved to receive packing rings or gaskets 22 for acting on the flat faces 12a of the bosses. These rings 22 can be composed of any suitable resilient material such as oil-resistant synthetic rubber, felt, cork, or the like.

The eye members 14b have cylindrical inner walls 23 receiving metal bearing sleeves 24 for presenting a bearing surface to each trunnion 13. The outer ends of the cylindrical walls 23 can be countersunk as at 23a to receive closure plates 25. The closure plates 25 can be pressed into the counterbores 23a.

As shown in Figure 2, the closure plugs or plates 25 are somewhat spaced from the ends of the trunnions 13 for a purpose to be more fully hereinafter described.

From the above description it will be understood that the housing 11 of the joint construction is swingable or tiltable relative to the yoke support 14 since the trunnions 13 of the housing are rotatably mounted in the bearings 24 of the yoke member. The housing can tilt on the bearings 24 in the longitudinal plane of the shank 14c and tie rod 17. Angulation throughout an arc of 270° or greater is provided, without effecting any angulation of the housing mounted joint parts.

The housing 11 has a bore therethrough normal to the trunnions 13 thereof for providing a chamber 30, a segmental spherical bearing wall 31 converging toward the top of the housing and a circular opening 32 in the top of the housing.

The top of the housing has a flat face 11a apertured by the opening 32. A stud 33 has a shank 34 projecting through the opening 32 of the housing and a head 35 disposed in the housing. The head 35 is segmental spherical with a flat bottom end of larger diameter than the shank and having a small diameter rounded button 36 depending from the central portion thereof. The shank portion 34, which extends through the opening 32, is of smaller diameter than the opening so that the stud can be tilted relative to the housing. As is customary, the shank portion 34a immediately above the cylindrical portion in the opening 32 is tapered to receive therearound the boss or eye end of a steering arm or similar connection. The free end of the stud has a reduced diameter threaded portion 34b receiving, in threaded relation, a nut 37 to hold in position the member (not shown) which is seated on the tapered portion 34a of the stud.

A washer 38 is seated on the flat top face 11a of the housing and snugly embraces the cylindrical portion of the stud to move with the stud. This washer is urged against the top face 11a of the housing by a coiled spring 39 which can be compressed between the washer and the under face of the member seated on the tapered surface of the stud so that, as the stud is tilted relative to the housing, the washer will slide along the flat face of the housing in sealing engagement therewith to prevent leakage of lubricant from the housing and ingress of dirt to the housing.

A bearing seat 40 is mounted on the head 35 of the stud in bearing relation therewith and has an external wall in bearing relation with the bearing wall 31 of the housing. This seat 40 preferably has a cylindrical neck portion 40a embracing the cylindrical portion of the stud shank 34 so as to be carried with the stud during tilting movements thereof. However, the stud can rotate about its own axis inside of the bearing seat 40. Thus, rotation of the stud about its own axis may be borne on the bearing surfaces provided by the stud head 35 and the inner face of the seating ring 40 while tilting movements of the stud relative to the housing will be borne on the housing bearing wall 31 and the outer face of the seating ring 40. Tilting movements of the housing relative to the yoke will be borne on the bearing surfaces provided by the trunnions 13 and the bearing sleeves 24.

A cup-shaped retainer member 41 is disposed in the chamber 30 of the housing and has a rounded dimple or depression 41a in the top wall thereof to receive the button end 36 of the stud. A coiled spring 42 is disposed in the retainer 41 to urge the same against the button end 36 of the stud.

A closure plate or disk 43 is seated in the lower end of the housing in a countersunk portion 44 thereof. The bottom end of the housing can be spun over the face of the closure disk as at 45 to hold the disk in position. The disk supports the spring 42 so that the spring is held under compression between the top wall of the retainer and the top face of the plate.

A lubricant fitting 46 is threaded through the plate or disk 43 to place the chamber 30 in communication with a grease gun or the like source of lubricant. The top wall of the retainer 41 can have a series of holes 41b therethrough to permit free passage of lubricant from the interior of the retainer to the interior of the chamber around the retainer.

The side walls and trunnions of the housing have lubricant conveying bores 47 therethrough placing the chamber 30 in communication with the space between the plugs or closure plates 25 and the ends of the trunnions so that lubricant can flow out of the bores into the chambers provided by the eye members 14b and thereby lubricate the bearings 24 so that the trunnions will rotate on lubricated surfaces.

A single lubricant fitting 46 will thus supply lubricant to all of the bearing surfaces of the assembly including the surfaces provided by the stud head 35, the inner and outer faces of the seating ring 40, the inner bearing wall 31 of the housing, the button 36, the dimple 41a, the trunnions 13, and the inner faces of the bearing sleeves 24. The packings 22 and washer 38 will prevent excess leakage of lubricant out of the assembly.

The stud 33 can rotate about its own axis relative to the housing and can tilt in all planes relative to the housing. However, the tilting movements relative to the housing may be somewhat more limited than is desirable in certain installations. In accordance with this invention the yoke mounting will permit increased angulation of the stud in one plane.

It will, of course, be understood that various details of the invention may be varied through a wide range without departing from the principles of this invention and it is, therefore, not the purpose to limit the patent granted hereon otherwise than necessitated by the scope of the appended claims.

We claim as our invention:

1. A joint construction comprising a cylindrical one-piece joint housing having laterally extending diametrically opposed bosses with flat outer faces, cylindrical trunnions projecting from said bosses, a yoke member having bearing housings receiving said trunnions in rotatable relation, seal rings between said bearing housings and said flat faces of said bosses, a stud tiltably and rotatably mounted in said joint housing having a shank portion projecting from the housing, passageways joining the interior of said joint housing with the interiors of said bearing housings of the yoke member, and means for introducing lubricant into said housing for lubricating all bearing surfaces.

2. A joint construction comprising a one-piece housing having a longitudinal bore therethrough with an inturned end portion defining a restricted opening to said housing, a stud having a shank portion projecting freely through said opening, a head on said stud movably mounted in said housing, a closure plate for the other end of said housing, a lubricant fitting communicating with the interior of the housing, means under compression between said closure plate and said stud head urging the stud head into proper bearing engagement in the housing, trunnions projecting laterally at the sides of said housing, a yoke member having bearing bosses receiving said trunnions in bearing relation, closure members for the outer faces of said bearing bosses, and said housing and trunnions having passageways therethrough joining the interior of the housing with the interiors of the bearing bosses whereby lubricant from said fitting can flow to all bearing surfaces of the joint construction.

3. A tie rod end construction for threaded connection in the end of a tie rod comprising a split yoke member composed of identical half-sections, rivets securing said half-sections together to provide a yoke with an externally threaded shank portion for threading into a tie rod, outwardly bowed arms at one end of said shank portion, and bearing bosses on the ends of said arms, a one-piece joint housing having laterally extending trunnions rotatably mounted in said bearing bosses, a stud tiltably and rotatably mounted in said housing, passageways connecting the interior of said housing with the interior of said bearing bosses, and means for introducing lubricant into the housing for flow to all bearing surfaces of the joint construction.

4. A tie rod end assembly comprising a one piece open ended housing defining a socket chamber, a stud having a head portion tiltably and rotatably mounted in said socket chamber and a shank portion projecting freely through an open end of the housing, a closure for the other open end of the housing, a lubricant fitting carried by said closure communicating with the socket chamber, resilient means in said socket chamber bottomed on said closure acting on said stud to urge the stud toward the other open end of the housing, diametrically opposed trunnions projecting laterally from said housing, a two piece yoke, each yoke piece having an eye rotatably receiving a trunnion and a semi-cylindrical stem with an abutment face and a semi-circular threaded face, means securing the yoke pieces together with the abutment faces of the stems in face to face engagement to provide an externally threaded cylindrical stem and hold the inner faces of the eyes inwardly of the outer ends of the trunnions, and means closing the outer ends of the eyes, said housing and trunnions having lubricant passages therethrough joining the socket chamber with chambers in the eyes whereby lubricant from the fitting can flow to all bearing surfaces of the tie rod end assembly.

MATTHEW P. GRAHAM.
ANTHONY VENDITTY.